United States Patent [19]

Ueta et al.

[11] Patent Number: 5,625,470
[45] Date of Patent: Apr. 29, 1997

[54] COLOR IMAGE SCANNER HAVING MULTIPLE LEDS AND COLOR IMAGE SCANNING METHOD THEREOF

[75] Inventors: Souichi Ueta; Hidehisa Tsuchihashi, both of Kawasaki; Toru Ochiai, Matsudo, all of Japan

[73] Assignee: Nikon Corporation, Tokyo, Japan

[21] Appl. No.: 391,084

[22] Filed: Feb. 21, 1995

Related U.S. Application Data

[63] Continuation of Ser. No. 165,504, Dec. 13, 1993, abandoned.

[30] Foreign Application Priority Data

Dec. 11, 1992 [JP] Japan ........................... 4-352962
Dec. 25, 1992 [JP] Japan ........................... 4-093260

[51] Int. Cl.$^6$ ........................................ H04N 1/04
[52] U.S. Cl. ........................ 358/505; 358/509; 358/475
[58] Field of Search ............................. 358/500, 505, 358/509, 474, 475; 355/228, 229; H04N 1/46, 1/04

[56] References Cited

U.S. PATENT DOCUMENTS

| | | | |
|---|---|---|---|
| 4,458,264 | 3/1984 | Tamura | 358/509 |
| 4,658,303 | 4/1987 | Nagano . | |
| 4,809,061 | 2/1989 | Suzuki | 358/514 |
| 4,926,252 | 5/1990 | Nagano | 358/505 |
| 4,939,584 | 7/1990 | Sakakibara et al. | 358/500 |
| 5,019,897 | 5/1991 | Shirata et al. | 358/505 |
| 5,025,204 | 6/1991 | Su . | |
| 5,115,304 | 5/1992 | Yoshikawa et al. | 358/500 |
| 5,138,310 | 8/1992 | Hirane et al. . | |
| 5,251,021 | 10/1993 | Parulski et al. | 358/500 |
| 5,268,752 | 12/1993 | Fukada et al. | 358/500 |
| 5,450,215 | 9/1995 | Iwama | 358/509 |

FOREIGN PATENT DOCUMENTS

| | | |
|---|---|---|
| 0452759A2 | 10/1991 | European Pat. Off. . |
| 2635245 | 7/1989 | France . |
| 3540528A1 | 11/1984 | Germany . |
| 3813664A1 | 11/1988 | Germany . |
| 62-62101 | 12/1987 | Japan . |
| 63-062474 | 3/1988 | Japan . |
| 2-012976 | 1/1990 | Japan . |
| 02012976 | 1/1990 | Japan . |
| 3013166 | 1/1991 | Japan . |
| 4-240692 | 8/1992 | Japan . |
| 4-215379 | 8/1992 | Japan . |
| 2159016A | 11/1985 | United Kingdom . |
| 2222050 | 2/1990 | United Kingdom . |

OTHER PUBLICATIONS

EPC Search Report dated Apr. 25, 1994.

*Primary Examiner*—Kim Vu

[57] ABSTRACT

A color image scanner and color image scanning method that generates three different colors independently using multiple LEDs and controls the exposure time of a charge coupled device (CCD) and the light emitting time of the LEDs in order to maintain suitable balance and levels for the colors which are generated. A primary timer sets the operation time of the CCD and a secondary timer sets the ON time for each LED. In addition, an LED drive circuit driving the LEDs has two constant current circuits to more evenly read the images of the document to be scanned.

19 Claims, 9 Drawing Sheets

COLOR IMAGE SCANNER HAVING MULTIPLE LEDS AND COLOR IMAGE SCANNING METHOD THEREOF

This application is a continuation of application Ser. No. 08/165,504, filed Dec. 13, 1993, now abandoned.

BACKGROUND OF THE INVENTION

1. Field of the Invention

The present invention relates to a scanner and method thereof for scanning images of an original document, for example, film of a camera, by illuminating the document with a light source. In this manner, characters and graphics on the document may be read.

2. Description of the Related Art

Scanners which scan color images of a document are well known in the art. In one such conventional scanner, a lamp is turned on all the time, and a filter with one of three primary colors (red, green and blue) is placed in front of the lamp, thereby radiating light from the lamp onto the document through the filter. Subsequently, light that has passed through the document is received at a photocell, such as a charge coupled device (CCD), and the data thereof is converted from analog to digital, and then stored. By conducting the same operation for each of three color filters, data for the three primary colors is obtained.

Additionally, during scanning for each color, the exposure level is controlled by adjusting, in gradual stages, the levels of analog signals that are generated for the CCD, as well as controlling the accumulation time (exposure time) of the CCD. The exposure level is roughly adjusted by adjusting the levels of the analog signals by stages, while the exposure level is finely adjusted by controlling the accumulation time of the CCD.

In this conventional scanner, as described above, the exposure level is finely tuned by adjusting the accumulation time for the CCD. As a result, accumulation time for the CCD can not be set for a time less than the time required for A/D conversion of the CCD output for storage in memory and, consequently, overexposure may occur.

In order to solve this problem, a darker lamp or an addition of an aperture has been considered. However, by doing so, irregularities in the brightness of the lamp or in the darkness of the filters may appear, thereby varying the brightness of radiation on the original document. Adjustments must be made according to each variance, which is time consuming and inconvenient.

With the above-mentioned conventional scanner, because a filter change is necessary in order to obtain data for each of the three primary colors (red, blue and green), there is an inability to perform quick scanning because of the time required to physically exchange the filters. Furthermore, because the lamp is always turned on, the temperature of the device increases due to heat generation and, as a result, a mechanism to cool the lamp is necessary.

In another conventional scanner, light-emitting diodes (LEDs) for red, green and blue (LEDR, LEDG and LEDB, respectively) are provided to irradiate the document with light from each of the LEDs sequentially. Then the light from LEDR, LEDG or LEDB that has been reflected by the document or transmitted through the document, is detected by a sensor comprising, for example, a CCD and the like.

This second conventional scanner uses a constant current circuit to illuminate each LED and if a large amount of noise is present in the electrical power source, the light emission volume of each LED might fluctuate according to the noise in the electrical power source. With such variation in the light volume of each LED, if images are scanned sequentially, line by line, irregularities occur in the scanned image, causing image deterioration.

SUMMARY OF THE INVENTION

It is therefore an object of the present invention to achieve the ability to finely adjust exposure levels, such that suitable exposure is achieved as well as prompt scanning being performed.

It is another object of the present invention to reduce heat generation from the scanning device.

It is still another object of the present invention is to more evenly read the images of the document.

The above objects are achieved by providing a color image scanner for reading images from a document, the color image scanner comprising (a) a plurality of light-emitting diodes radiating a corresponding plurality of light colors onto the document; (b) control means for generating timing control signals corresponding to the plurality of light-emitting diodes; (c) means for alternatively driving the plurality of light-emitting diodes by supplying respective currents through the plurality of light-emitting diodes in response to the corresponding timing control signals and maintaining the currents constant in response to feed-back from the respective light-emitting diodes; and (d) means tier reading the plurality of light colors radiated on the document and forming image signals.

A scanner and method thereof according to the present invention includes LEDs (e.g., LEDR, LEDG and LEDB emitting red, green and blue, respectively) that independently generate light, an LED drive circuit for independently driving the LEDs (e.g., the LEDR, LEDG and LEDB) and a CPU which controls the LED drive circuit. A charge coupled device (CCD) acts as a photoelectric conversion element which receives the light generated by the LEDs and generates signals corresponding to the received amount of light. An analog-to-digital (A/D) converter converts the output from the CCD from analog to digital, a memory stores signals generated from the A/D converter and a FIFO memory, located between the A/D converter and the memory, temporarily stores the output data from the A/D converter.

A first scan of a document is performed by irradiating the light generated from LEDR, LEDG and LEDB over the original document, and photoelectrically converting the light that passes through the document onto the CCD. An exposure level is calculated based on data obtained from the first scan. Then, a second scan is performed by irradiating the light from LEDR, LEDG and LEDB over the document onto the CCD and photoelectrically converting the light. Exposure during the second scan step is controlled according to the exposure level that is obtained by calculating the data from the first scanning.

Control of exposure during the second scan may be achieved by causing a primary timer that sets the operation time of the CCD and a secondary timer that sets the ON time for each of the LEDs. Additionally, LEDR, generating red light, may be turned on first during the first and second scan.

In order to control the turning ON and OFF of the LEDs, a primary constant current circuit may be used to supply a constant current to one of the LEDs (e.g., LEDR) and a secondary constant current circuit may be used to supply a constant current to either one of the remaining two LEDs (e.g., LEDG and LEDB). A selector circuit selects one of the LEDs. Also, analog switches may be used to selectively activate the primary and secondary constant current circuits in response to selection by the selector circuit. Furthermore, the selector circuit and primary and secondary constant current circuits may be connected to the LEDs such that a first line is connected to an anode of LEDR and cathodes of LEDG and LEDB, a second line is connected to the cathode of LEDR and an anode of LEDG and a third line is connected to an anode of LEDB.

BRIEF DESCRIPTION OF THE DRAWINGS

These and other objects and advantages of the present invention will become apparent and more readily appreciated from the following description of the preferred embodiments, taken in conjunction with the accompanying drawings, of which.

DESCRIPTION OF THE PREFERRED EMBODIMENTS

Figure 1:
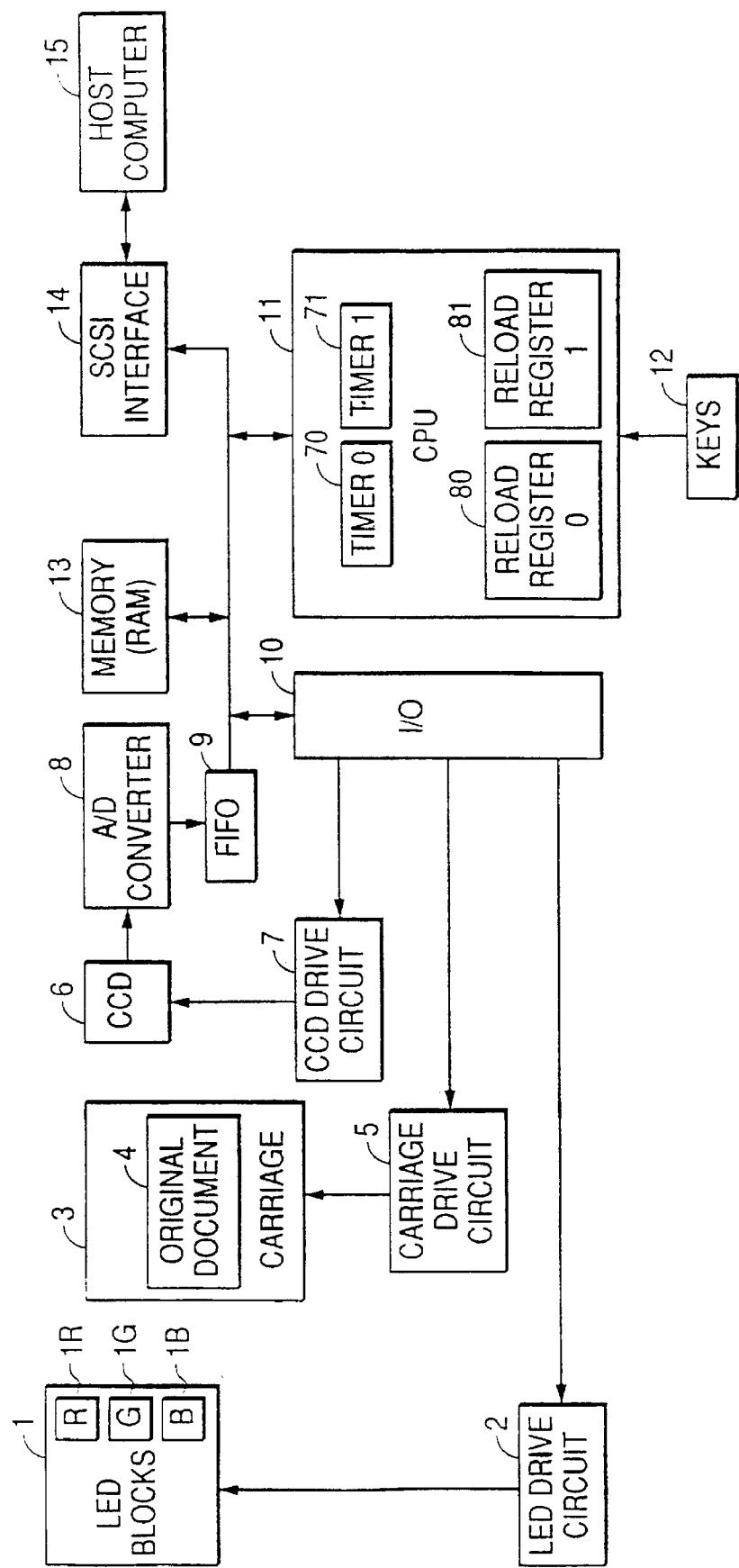
FIG. 1 is a block diagram showing the configuration of a first embodiment of the present invention.

The present invention is described with reference to the drawings which were briefly described above and which are now referred to in order to provide a detailed description of the preferred embodiments. Like parts will be identified with like reference numerals.

FIG. 1 is a block diagram showing the configuration of a first embodiment for a scanner of the present invention. LED block 1 contains light-emitting diodes 1R (LEDR), 1G (LEDG) and 1B (LEDB) that independently generate light in three primary colors, red (R), green (G) and blue (B), respectively. LED drive circuit 2 is designed to drive LEDR, LEDG and LEDB independently.

Original document 4 comprises, for example, 35 mm camera film or the like, and is positioned on carriage 3. The original document to be scanned, of course, can constitute a media other than 35 mm film. When the carriage 3 is positioned at a specified location and one of the LEDs is turned on, the light thereof is irradiated and charge coupled device CCD 6 detects the light that has penetrated the original document 4. A carriage drive circuit 5 drives carriage 3 via a stepping motor (not shown) to move and position carriage 3 (and also document 4) to a specified location.

CCD drive circuit 7 drives CCD 6, such that CCD 6 photoelectrically converts the light from the original document 4 and supplies the image data to analog-to-digital A/D converter 8. A/D converter 8 converts the analog image signals to digital image signals and supplies same to FIFO memory 9. FIFO memory 9 temporarily stores the image data supplied from A/D converter 8 and CPU 11 controls the FIFO memory 9 during specified intervals, reading the data stored therein, and transfers the data to memory (RAM) 13 to be stored. In addition, CPU 11 reads the data stored in memory 13 and transfers it to host computer 15 via SCSI interface 14. Users operate the host computer 15 to enter specified commands for the CPU 11. Also, CPU 11 is so designed that specified data and commands may be entered by operating keys 12. Input/output (I/O) interface 10 transmits signals corresponding to the controls from CPU 11 to the LED drive circuit 2, carriage drive circuit 5 and CCD drive circuit 7.

Figure 2:
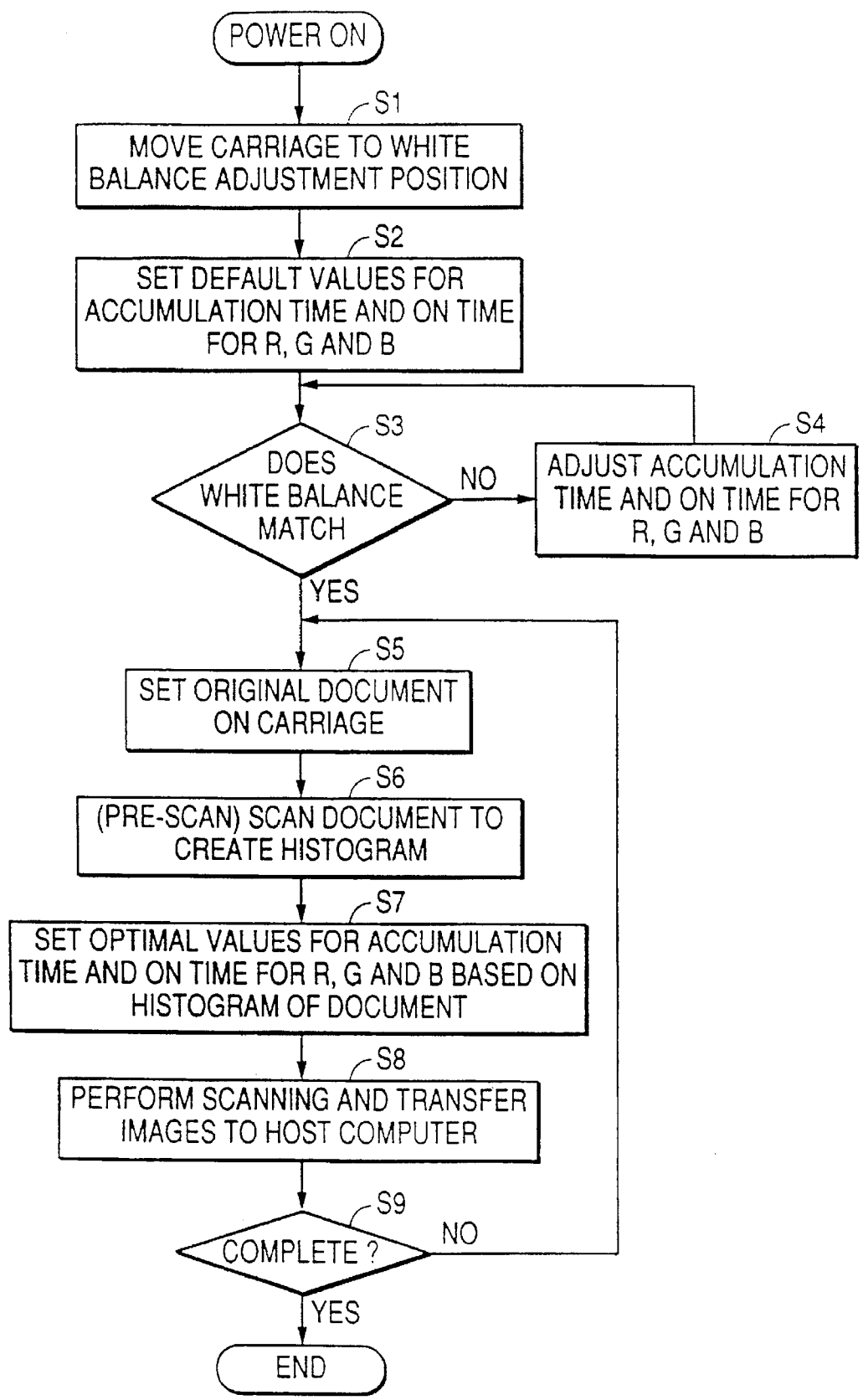
FIG. 2 is a flowchart explaining the operation of the first embodiment shown in FIG. 1.

Next, referring to the flow chart in FIG. 2, a scanning method with operations of the device of FIG. 1 are explained. By operating a specified key among the operating keys 12 to turn power on, CPU 11 begins the process shown in FIG. 2. First, at step S1, CPU 11 controls carriage drive circuit 5 via interface 10 and moves carriage 3 to a specified location (white balance adjustment position). At this time, original document 4 is not placed on carriage 3.

Subsequently, at step S2, CPU 11 sets the accumulation time (exposure time) for the light in each color, R, G and B, at CCD 6 when light thereof is irradiated, and the default values for the ON time for LEDR, LEDG and LEDB that generate light in the red, green and blue colors. Then, a scan is performed for a white balance adjustment.

In LED drive circuit 2 of FIG. 1 (as well as the LED drive circuit 2 of FIG. 5), constant current circuits may be employed, enabling the driving of LEDR, LEDG and LEDB, independently. By doing so, the intensity of the light generated from each LED may be stabilized.

More specifically, CPU 11 turns on LEDR first, and the red light is directed into CCD 6 via carriage 3. CPU 11 also controls CCD drive circuit 7 to cause CCD 6 to photoelectrically convert the light that enters CCD 6 at this time, thereby generating analog signals corresponding to the received amount of light. A/D converter 8 converts these analog signals from analog to digital signals for temporary storage in FIFO memory 9. CPU 11 reads the data that has been stored in FIFO memory 9 at specified intervals and transfers the data to memory 13 to be stored.

Next LEDG and LEDB are turned on in sequence to execute the same process. Subsequently, memory 13 stores the data obtained when the light in the corresponding colors are irradiated on carriage 3. CPU 11 calculates the data stored in memory 13 to determine if the white balance matches, or does not match, during step S3. As shown in FIG. 2, if it is determined that the white balance does not match the operation of the scanner proceeds to step S4, where accumulation time and ON time for R, G, and B are changed to different values from default values that have been set at step S2. These processes are repeated until the white balance is adjusted.

In step S3, if it is determined that the white balance adjustment has been completed, the operation of the scanner proceeds to step S5 where the user sets original document 4 on carriage 3. When original document 4 is set on carriage 3, CPU 11 proceeds to step S6 and performs pre-scanning, thereby creating a histogram from the data obtained at that time.

More specifically, CPU 11 drives carriage 3 via carriage drive circuit 5 to position carriage 3 at a specified location. Then CPU 11 initiates LED drive circuit 2 to turn ON LEDR for a specified period of time. Additionally, CPU 11 controls CCD 6 to accumulate images of original document 4 that have been irradiated with light from LEDR for a specified period of time. This ON time and accumulation time are the adjusted values from step S4. Signals that have been read from CCD 6 are stored in memory 13 via A/D converter 8 and FIFO memory 9. Similar processes are performed by turning on LEDG and LEDB, in sequence. Subsequently, CPU 11 creates a histogram for the brightness corresponding to original document 4 based on the data that has been stored in memory 13.

Next, the operation of the scanner proceeds to step S7, wherein optimal values for accumulation time and ON time for R, G, and B are calculated based on the histogram that has been prepared in step S6.

At step S8, scanning is performed. At this time, the ON time for LEDR, LEDG, and LEDB, and the accumulation time of CCD 6 while these LEDs are turned ON, are set for the values that were obtained in step S7. Subsequently, original document 4 is read under suitable exposure conditions. Signals read by CCD 6 are stored in memory 13 via A/D converter 8 and FIFO memory 9 in the same manner as noted above. CPU 11 transfers data that has been read during the scanning to host computer 15 via SCSI interface 14, as necessary.

Then, the operation of the scanner proceeds to step S9 and unless there is a command from host computer 15 to cancel the scanning operation, the operation returns to step S5 and subsequent steps are repeatedly performed.

Figure 3A:
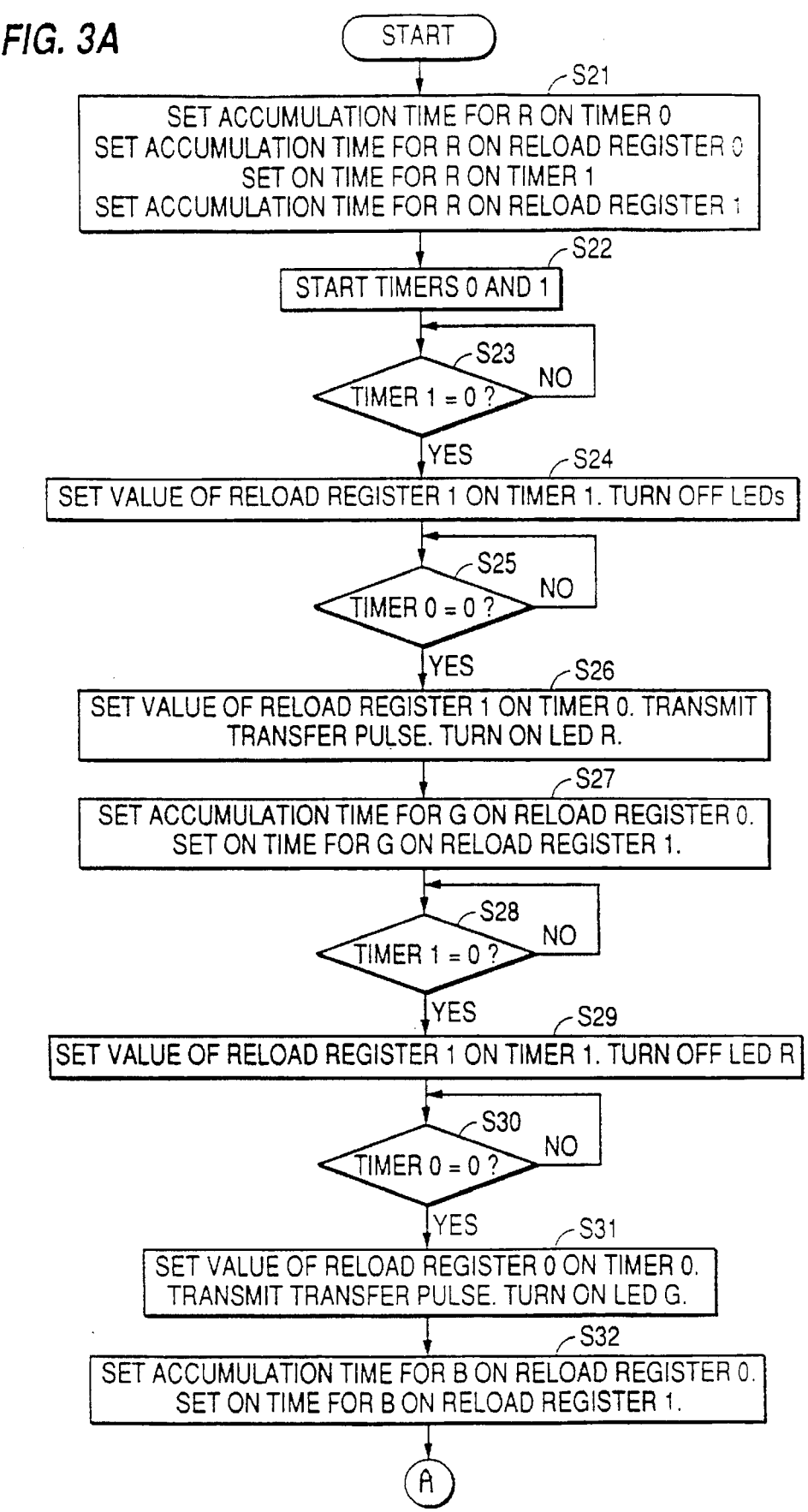
FIGS. 3A and 3B are flowcharts explaining the processing of one line portion in the scanning operation in step S8 of FIG. 2.
Figure 3B:
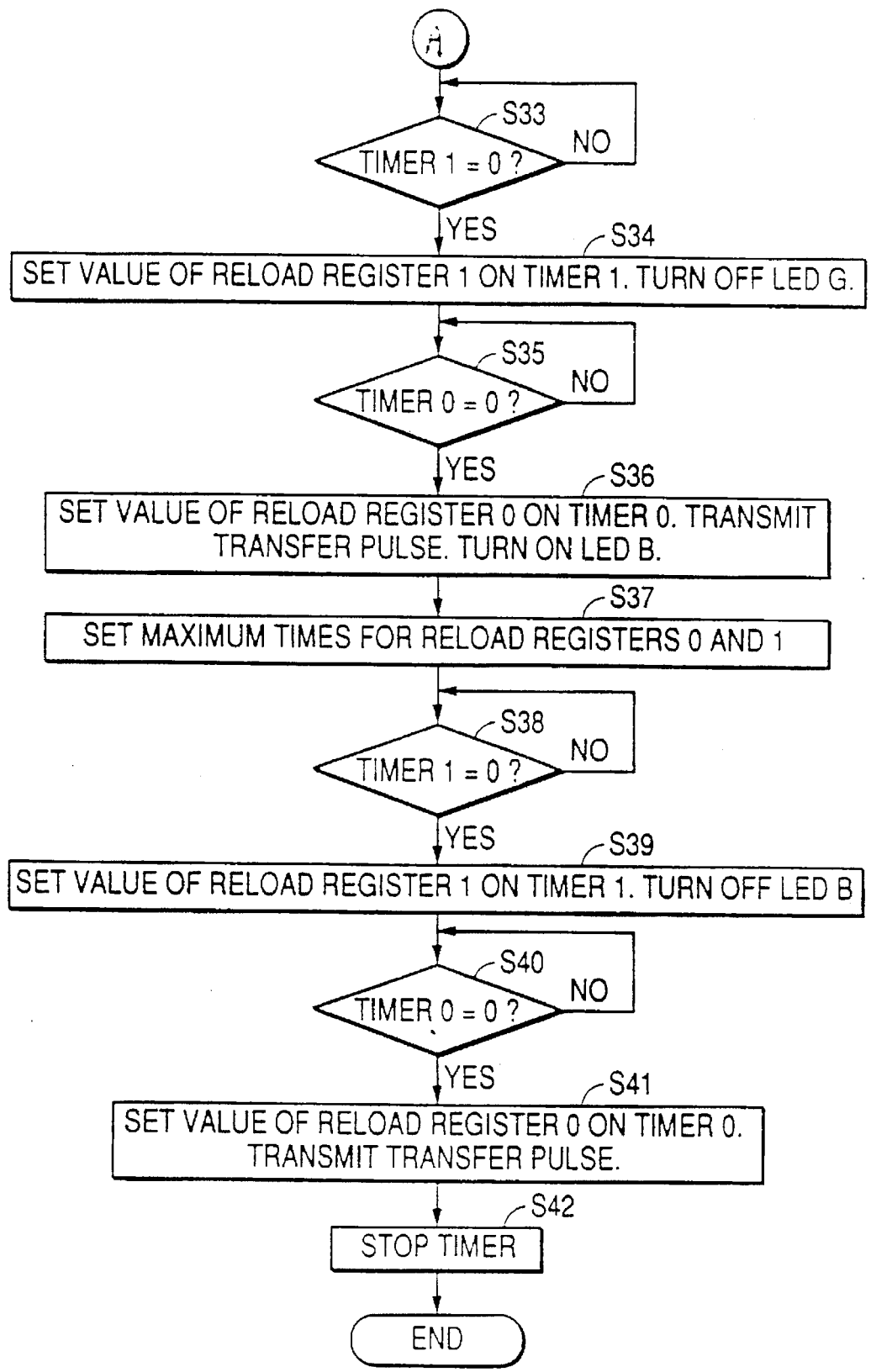
Figure 4:
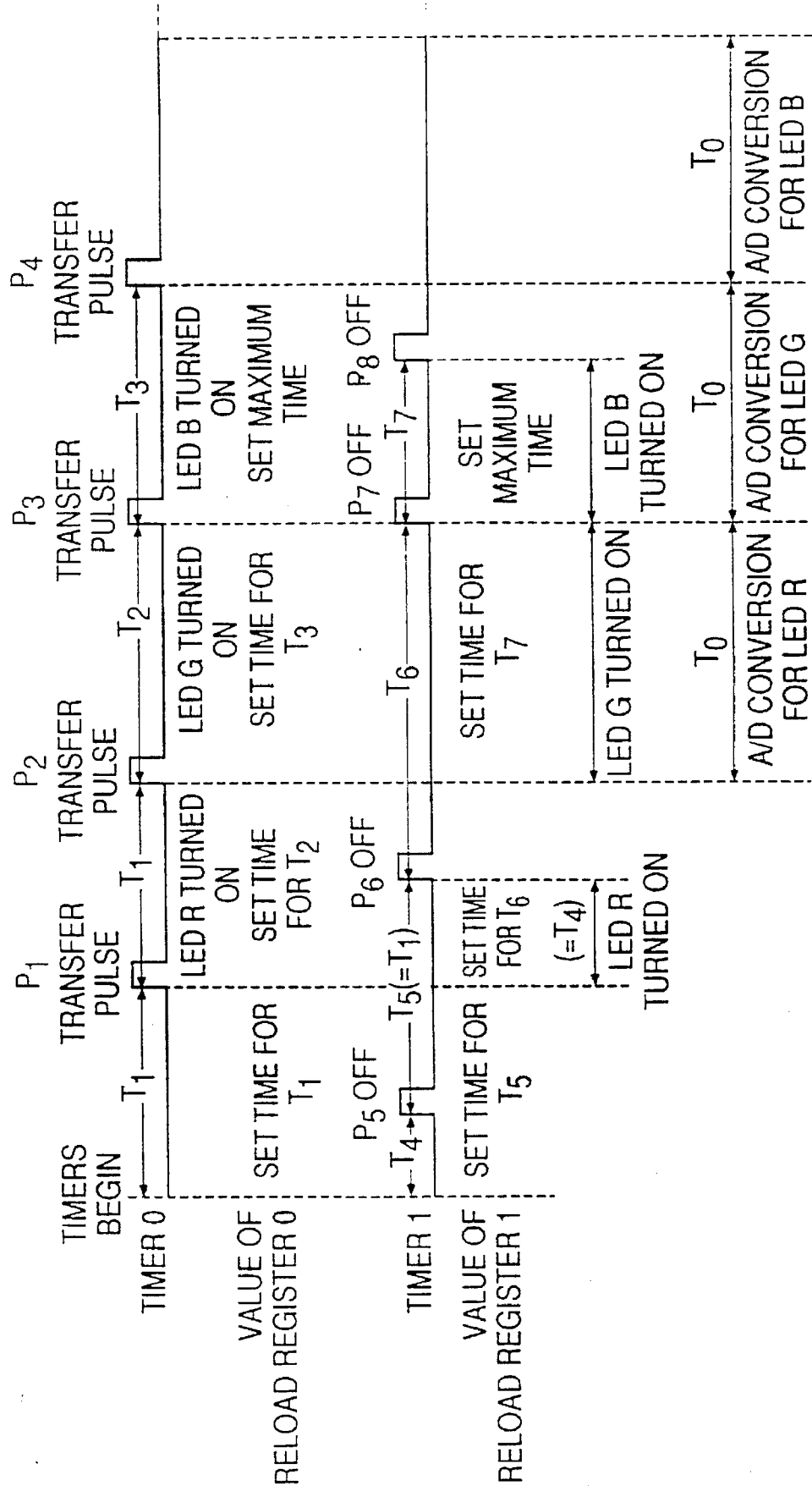
FIG. 4 is a timing chart showing the operation of the first embodiment shown in FIG. 1 during execution of the steps of FIGS. 3A and 3B.

Next by referring to flowcharts in FIGS. 3A and 3B and the timing chart in FIG. 4, a process to store data for a line during the scanning in step S8 in FIG. 2 is further explained. First, in step S21, accumulation time $T_1$ for R at CCD 6 is set on the primary timer (timer 0, element 70 in FIG. 1), that has been integrated in CPU 11. Furthermore, accumulation time $T_1$ for R is set on reload register 0 (element 80 in FIG. 1) (also built in CPU 11), that sets the operation time of timer 0 during the subsequent period. Similarly, time $T_4$ is set on the secondary timer (timer 1, element 71 in FIG. 1), that is integrated in CPU 11 as the time to stipulate the ON time for LEDR. Additionally, time $T_5$ is set on reload register 1 (element 81 in FIG. 1) (also integrated in CPU 11) that stipulates the period until LEDR turns OFF for timer 1 during subsequent periods. In this embodiment, time $T_5$ is set for the same value as the time $T_1$ that was set on timer 0 and reload register 0. Thus, if $T_1=T_5$, the actual ON time for LEDR is the same time $T_4$ that has been set on timer 1 as shown in FIG. 4. The details will be explained later.

Proceeding to step S22, timer 0 and timer 1 are started simultaneously. The timing chart in FIG. 4 shows the state subsequent to this start. Then, proceeding to step S23, it is determined whether or not timer 1 reaches 0. More specifically, in this embodiment, timers 0 and 1 are designed so that the set times are decremented in sequence and thereby, the associated values become 0 when the set time has elapsed.

In step S23, when timer 1 is determined to be 0 (i.e., when time $T_4$ has elapsed), the operation process of the scanner proceeds to step S24, where a value of reload register 1 (which has been set for time $T_5$ in step S21) is set on timer 1. Subsequently, timer 1 now performs the timing operation until time $T_5$ elapses. Furthermore, at this time CPU 11 turns OFF LEDR, LEDG and LEDB via LED drive circuit 2. If a set value for reload register 1 in step S21 is preset as $T_4+T_5$, the initial register setting operation to turn ON an LED is no longer required.

At step S25, it is determined whether time $T_1$ has been timed or not, since timer 0 started timing the operation. When time $T_1$ has elapsed, after starting a timer, the operation proceeds to step S26 where a value of reload register 1 (which has been set for time $T_1$ in step S21) is set on timer 0. Subsequently, timer 0 immediately starts operating to time the next time $T_1$.

Also, at this time, transfer pulse $P_1$(FIG. 4) is provided to CCD 6 from CCD drive circuit 7. Subsequently the electrical charge that has accumulated in CCD 6 up to the present, is shifted to a register. However, this electrical charge is discarded as it is not substantially the data developed from the reading of original document 4. Furthermore, at this time, LEDR is driven by LED drive circuit 2, thereby generating red light. This red light enters CCD 6 via original document 4 and carriage 3 and, henceforth, accumulation of electrical charges for the red light begins.

Then, the operation proceeds to step S27, where time $T_2$, which stipulates the accumulation time for the green light (G), is set as a value for reload register 0. Also, at this time, time $T_6$, which stipulates the period of time from LEDR OFF to LEDG OFF is calculated by the following equation and is set for reload register 1. It is apparent from FIG. 4 that time $T_6$ may be determined from the following equation: $T_6$ (the period of time from LEDR OFF to LEDG OFF=$T_1$ (LEDR's accumulation time) -$T_4$ (LEDR's ON time)+(LEDG's ON time).

Next, at step S28, it is determined whether timer 1 has successfully timed time $T_5$ or not. If it is determined that time $T_5$ has been timed, the operation proceeds to step S29 where OFF pulse $P_6$ is generated by LED drive circuit 2, thereby turning OFF LEDR. Consequently, it is presumed that LEDR has been ON for the period of time $T_4$ until OFF pulse P6 is generated after the generation of transfer pulse $P_1$(FIG. 4). Also during step S29, the value of reload register 1 (which has been set for time $T_6$ in step S27) is set on timer 1, and timer 1 immediately begins the timing operation for time $T_6$.

Reaching step S30, where it is determined whether timer 0 has successfully timed time $T_1$ or not; if it is determined that time $T_1$ has been timed, transfer pulse $P_2$ is generated from CCD drive circuit 7 to CCD 6 at step S31. Therefore, by turning on LEDR for time period $T_4$, an electrical charge that has accumulated in CCD 6 is transferred to an integrated register and then, the electrical charge is further transferred from this register to A/D converter 8 by taking time $T_1$. A/D converter 8 converts these signals from analog to digital and temporarily stores them in FIFO memory 9. CPU 11 reads the data that has been written in FIFO memory 9 at a specified time interval and transfers the data to memory 13 to be stored.

Additionally, when transfer pulse $P_2$ is generated, a value for reload register 0 (which has been set for time $T_2$ in step S27) is concurrently set on timer 0. Subsequently, timer 0 starts timing for time $T_2$ from this point on. Also, at this time, LEDG is driven, thereby generating green light, which enters CCD 6 via original document 4 and carriage 3. Consequently, accumulation of electrical charges for green light begins for CCD 6.

In step S32, a value for reload register 0 is set for time $T_3$, stipulating accumulation time for blue light (B's accumulation time). Additionally, a value for reload register 1 is set for time $T_7$ (the period of time from LEdG OFF to LEDB OFF) and is calculated according to the following equation:

$T_7$ (the period of time from LEDG OFF to LEDB OFF)=$T_2$ (LEDG's accumulation time)−(LEDG's ON time)+(LEDB's ON TIME)

The operation proceeds to step S33, where it is determined whether or not timer 1 has successfully timed time $T_6$ that was set in step S29. If it is determined that time $T_6$ has been successfully timed, the operation proceeds to step S34 where OFF pulse $P_7$ is generated, thereby turning off LEDG. Additionally, a value of reload register 1 (which is set for time $T_7$ in step S32) is set on timer 1, and timer 1 immediately begins the timing operation.

In step S35, it is determined whether or not timer 0 has successfully timed time $T_2$ and if it is determined that time $T_2$ has been successfully timed, the operation proceeds to step S36 where transfer pulse $P_3$ is generated. Subsequently, LEDB is turned ON, and an electrical charge that has accumulated in CCD 6 is transferred to a shift register, supplied to A/D converter 8, converted from analog to digital within $T_1$, and transferred to FIFO memory 9 to be stored. These data are transferred by CPU 11 to memory 13 at a specified time to be stored.

Furthermore, at this time, a value of reload register 0 (which has been set for time $T_3$ in step S32) is set on time 0. Subsequently timer 0 immediately begins the timing operating from time $T_3$. Additionally, at this time, LEDB is turned ON, thereby resulting in blue light entering CCD 6 via original document 4 and carriage 3, and the accumulation of the electrical charge for blue light begins. Then the operation proceeds to step S37, where maximum times are set for reload registers 0 and 1, accordingly. Setting the maximum times prevents disabling the A/D conversion of the data for blue color as subsequent pulses generated during the A/D conversion of the data for blue color will be described later.

At step S38, it is determined whether timer 1 has successfully timed time $T_7$. If it is determined that time $T_2$ has been successfully timed, the operation proceeds to step S39 where a value of reload register 1 (which has been set for maximum time in Step S37) is set on timer 1. Subsequently, timer 1 begins the timing operation for the maximum time. Also at this time, OFF pulse P8 is generated, thereby turning OFF LEDB.

Next, in step S40, if it is determined that timer 0 has timed time $T_3$, the operation further proceeds to step S41 where a value of reload register 0 (which has been set for the maximum value in step S37) is set on timer 0, and timer 0 begins the timing operation for the maximum time. Also, at this time, transfer pulse $P_4$ is generated, image signals for blue light, that have been accumulated by turning ON LEDB for period of time $T_7$, are transferred to a shift register in CCD 6, and are supplied to A/D converter 8, thereby converting the blue light data from analog to digital within time period $T_0$. The data that has been converted from analog to digital by A/D converter 8 is transferred to FIFO memory 9 to be stored. In the same manner as described above, CPU 11 reads the data written in FIFO memory 9 at specified timing intervals and transfers it to memory 13 for storage. Next, upon proceeding to step S42, timers 0 and 1 are stopped.

According to the above described operation, the data in three primary colors (red, green and blue) for an image of one line are obtained. Subsequently, CPU 11 drives carriage drive circuit 5, thereby moving carriage 3 (i.e., original document 4) for another one line increment. Similar scanning operations and steps are again executed. Such scanning steps for each line are performed for every line on original document 4, and thus, the data for red, green and blue (R, G, and B) for the entire original document 4 are processed.

Figure 5:
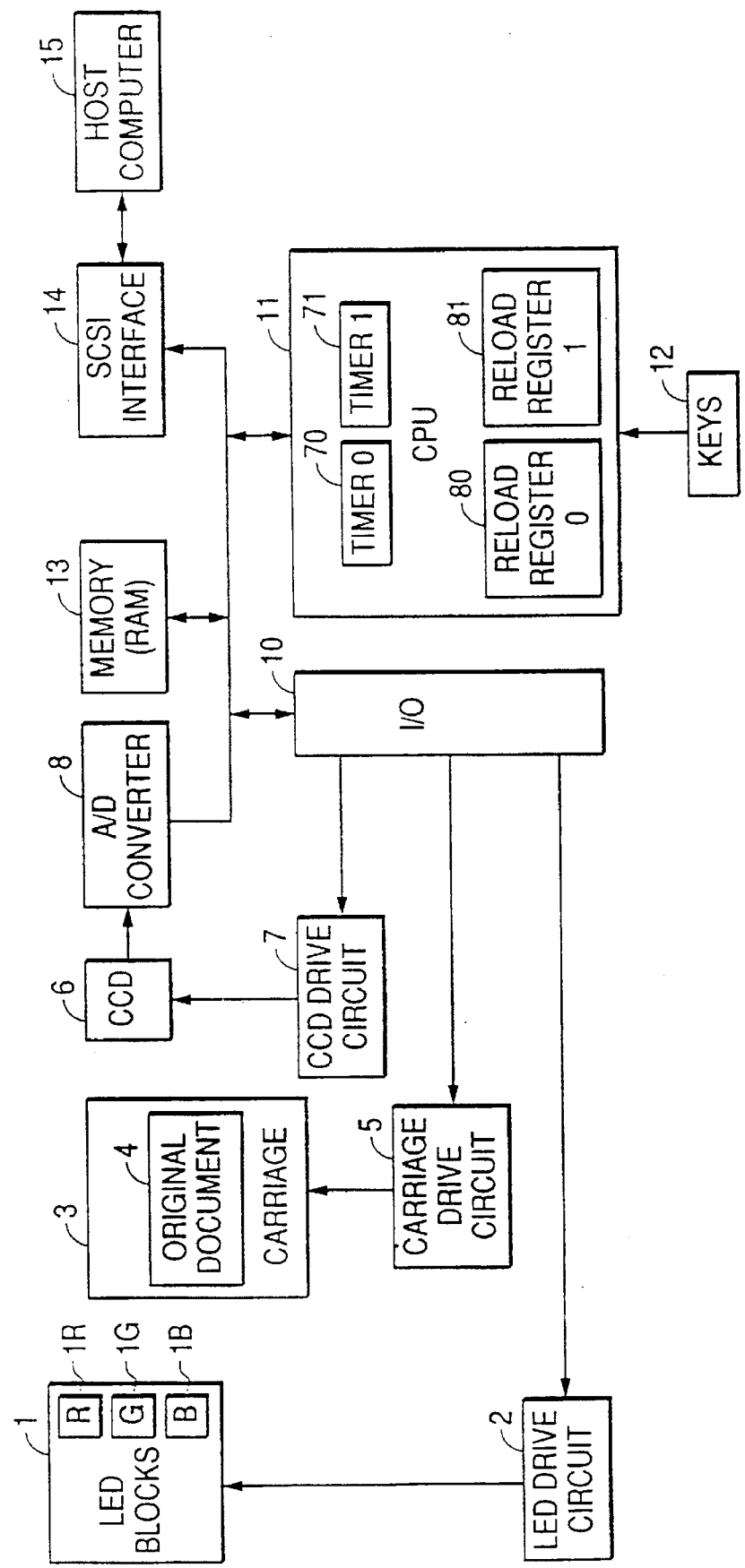
FIG. 5 is a block diagram showing the configuration of a second embodiment of the present invention.

FIG. 5 shows the configuration of a second embodiment for a scanner of the present invention wherein elements with the same reference numerals to those in FIG. 1 are applicable. In this second embodiment, the FIFO memory 9 used in the first embodiment of FIG. 1, is eliminated. Other elements and related configurations are the same as in FIG. 1.

In the second embodiment shown in FIG. 5, while CPU 11 transfers the output data from A/D converter 8 to memory 13 for storage therein, CPU 11 cannot perform other operations. Therefore, in this second embodiment, a minimum accumulation time in CCD 6 is stipulated for the A/D conversion operation by A/D converter 8. More specifically, as an LED cannot be turned OFF while A/D converter 8 performs its A/D conversion operation, followed by transferring the data to memory 13 to store the data therein, it is impossible to set the accumulation time at CCD 6 within a time period less than that required for the A/D conversion operation (i.e., to turn OFF the particular LED during this period).

LEDs with the capability to generate light for the colors red, green and blue (R, G and B) have been achieved. However, a LED that generates green light (G), or blue light (B) has inferior efficiency in comparison with the LED that generates red light (R), and is incapable of obtaining green light (G) or blue light (B) that is as intense as red light (R). In other words, in order to achieve a specified exposure level by irradiating light G or B, the irradiation time must be greater than the period for red light (R). That is, if exposed with red light, the exposure time can be relatively shorter.

Figure 6:
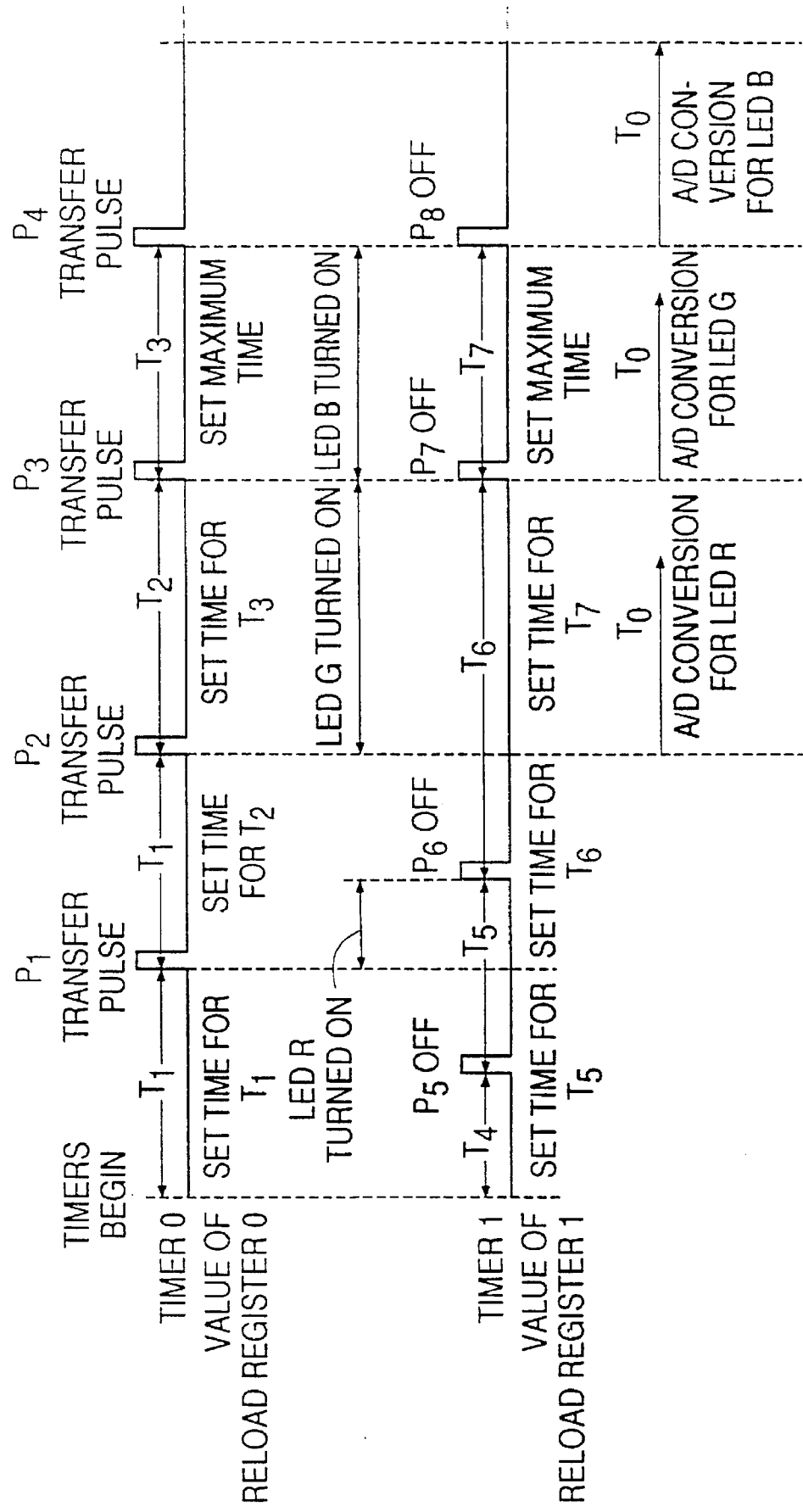
FIG. 6 is a timing chart showing the operation of the second embodiment in FIG. 5.

If timing of exposure with light (R) is done at time $T_2$, or $T_3$, in FIG. 6, a specified exposure level may be achieved in a relatively short period of ON time due to intense light; however, CPU 11 cannot perform the OFF operation for LEDR until the data, obtained from exposure at earlier time $T_1$ or $T_2$, are convened from analog to digital. More specifically, it is only at the first time, $T_1$, which is not associated with the A/D conversion operation, when the OFF operation for an LED may be performed within a timing period that is a shorter period of time than has elapsed after turning ON the LED. Therefore, in the first embodiment shown in FIG. 1, any of the LEDs for R, G, or B may be turned ON at time $T_1$, $T_2$, or $T_3$. However, for the second embodiment of FIG. 5, LEDR for the red color, which has the highest efficiency (if the light emission efficiency for other colors is better, the LED for that color is selected) is so designed as to be driven during the first time, $T_1$, as shown in the timing chart in FIG. 6.

In the timing chart in FIG. 6, OFF pulse $P_8$ cannot be generated during the A/D conversion operation for (G) data as shown in FIG. 4. Therefore, time $T_7$ is longer than that of FIG. 4. And also, in this second embodiment, a timer is stopped after the A/D conversion operation for blue light (B) data has been completed.

In the above first and second embodiments, the exposure level is controlled by using timer 0 and timer 1, but alternatively it is also possible to control exposure levels by, for example, performing interruption processes while executing a software. However, if done so, interruption cannot always be immediately executed and, therefore accurate control of the exposure level might become more difficult. Thus, it appears preferable to accurately control the exposure level through the interruption process while the execution of software is stopped through the use of the two timers as shown in the embodiments.

Figure 7:
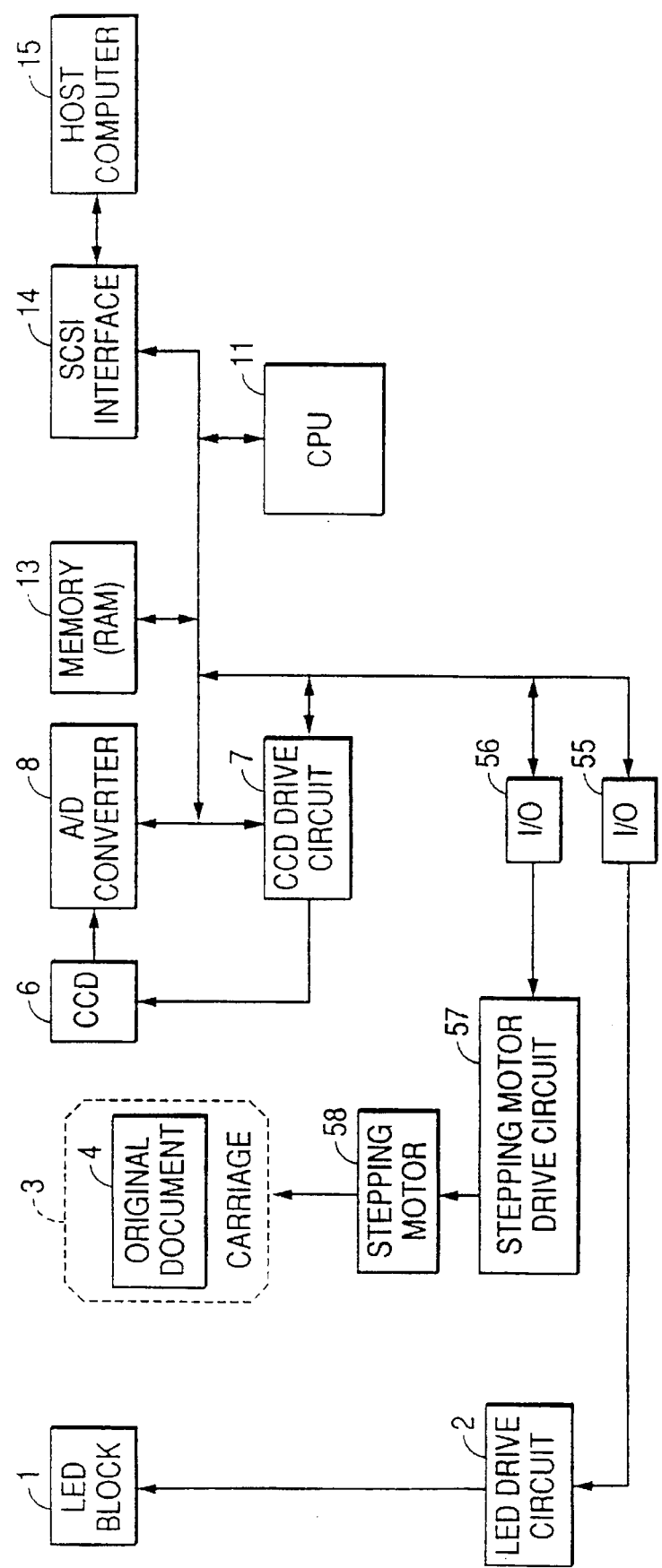
FIG. 7 is a block diagram showing the configuration of a third embodiment of the present invention.
Figure 8:
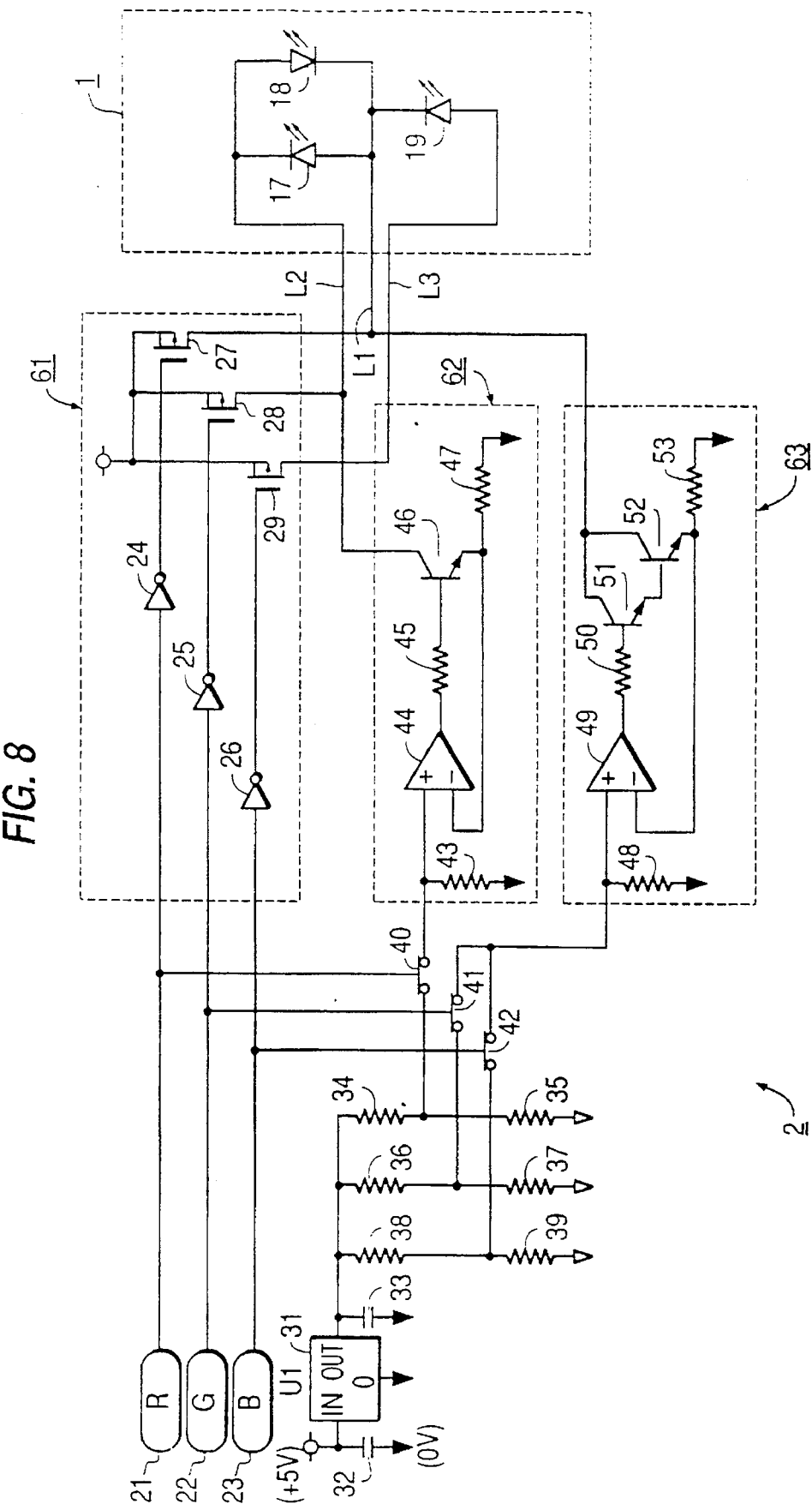
FIG. 8 is a circuit diagram showing the LED block and LED drive circuit of FIGS. 1, 5, and 7.

A detailed diagram for LED drive circuit 2 is set forth in FIG. 8, which circuit diagram may be used in the embodiments of FIGS. 1 and 5. However, circuit 2 of FIG. 8 is now explained, by way of example, in a third embodiment of the present invention shown in FIG. 7. In the LED drive circuit 2 with the above noted configuration of FIG. 8, when LED 17 is selected by selector 61, a constant current is supplied to LED 17 by constant current circuit 62. LED 18 or 19 is selected by selector circuit 61, and a constant current is supplied by constant current circuit 63 accordingly. Consequently, the variations in light emission volume of the LED caused by noise of the electric power source may be controlled, thereby providing means to more evenly read the images on the document.

FIG. 7 is a block diagram to demonstrate the configuration of the third embodiment of the scanner of the present invention. LED block 1 contains three LEDs 17, 18 and 19 (FIG. 8) for emitting red light (R), green light (G) and blue light (B), and is so designed that one unit thereof is driven by LED driving circuit 2, thereby generating light for R, G, and B independently. Light for R, G, or B that is emitted from LED block 1 is so designed that it irradiates document 4 that is placed on carriage 3 and the reflected light (or the penetrating light) thereof is detected by CCD 6. Stepping motor drive circuit 57 drives stepping motor 58, thereby moving carriage 3 a specified distance (by one line).

CCD 6 is so designed that it is driven by CCD drive circuit 7 to send signals, which correspond to incidental light, to A/D converter 8. A/D converter 8 converts analog input signals to digital signals and sends them to memory 13 to be stored. CPU 11 reads and processes data that is stored in memory 13 in response to commands that are provided from host computer 15 via SCSI interface 14, and it sends the data to host computer 15 via SCSI interface 14. Additionally, CPU 11 controls A/D converter 8 and CCD drive circuit 7 as well as controlling LED drive circuit 2, and stepping motor drive circuit 57, via input/output interface (I/O) 55 or 56, respectively.

When a command is provided from host computer 15 to start the scanning operation, CPU 11 activates stepping motor 58 via I/O 56 and stepping motor driving circuit 57 to move carriage 3 to a specified location. Subsequently, document 4, placed on carriage 3, is positioned at a specified location in reference to LED block 1 and CCD 6.

Additionally, CPU 11 controls LED driving circuit 2 via I/O 55 to turn on the LEDR in LED block 1. Light for R, that has been emitted from LED block 1, is irradiated over document 4 and the reflected, or penetrating, light thereof enters CCD 6 which is driven by CCD drive circuit 7 to send the signals, which correspond to incidental light for R, to A/D converter 8. A/D converter 8 converts the analog signals to digital signals and sends them to memory 13 to be stored.

As described above, when the data of the R-color component for a specified line on document 4 is read, CPU 11 controls LED block 1 via I/O 55 and LED driving circuit 2, thereby generating green light for (G). Subsequently, light for G is irradiated to the same location on document 4 where light for R was irradiated. Then light for G, that is reflected by document 4, is detected by CCD 6 and its output is provided to memory 13 via A/D converter 8 to be stored.

CPU 11 causes LEDB to generate light for B at LED block 1. This light for B also irradiates the same location on document 3 where light for R and light for G were irradiated, and the light from this area enters CCD 6. Signals generated by CCD 4 are provided to memory 13 via A/D converter 8 to be stored.

As described above, when the data of the R-color component for a specified line on document 4 is read, CPU 11 controls stepping motor 58 via I/O 56 and stepping motor driving circuit 57. Then, as described above, light for R, G, and B are irradiated from the LED block in sequence, and signals generated by CCD 6 are stored in memory 13 via A/D converter 8.

The above noted scanning processes are repeated for each line of the document, thereby reading the entire area of document 4. CPU 11 sends the data that has been stored in memory 13 to host computer 15 via interface 14, as required.

FIG. 8 shows an example of the configuration of LED block 1 and LED driving circuit 2. In this configuration, LED block 1 is comprised of LED 17 that generates light for R, LED 18 that generates light for G, and LED 19 that generates light for B. The anode of LED 17 and cathodes of LEDs 18 and 19 are connected by line L1. The cathode of LED 17 and anode of LED 18 are connected by line L2. Also, the anode of LED 19 is connected by line L3.

Lines L1 through L3 are connected to selector circuit 61 and constant current circuits 62 and 63, respectively. Selector circuit 61 is comprised of FETs 27, 28, and 29, and buffer amplifiers 24, 25, and 26 that are connected to gates of each FET. One end of FET 27 is connected to a specified voltage source (e.g., 5V) while the other end is connected to line L1.

Constant current circuit 62 is comprised of differential amplifier 44 and NPN transistor 46, wherein the output from differential amplifier 44 is applied to the base thereof via resistor 45. The collector for NPN transistor 46 is connected by line L2, and the emitter thereof is grounded through resistor 47 and also connected with the inverted input terminal of differential amplifier 44. The non-inverted input terminal of differential amplifier 44 is connected to a specified voltage source via resistor 43.

Furthermore, constant current circuit 63 comprises differential amplifier 49, NPN transistor 51 wherein the output from differential amplifier 49 is applied to the base, thereof, via resistor 50, and NPN transistor 52 that is connected to NPN transistor 51 by the Darlington method. Both collectors for NPN transistors 51 and 52 are connected to line L1. The emitter for NPN transistor 52 is grounded through resistance 53, and is also connected with the inverted input terminal of differential amplifier 49. The non-inverted input terminal of differential amplifier 49 is connected to a specified voltage source via resistance 48.

The high, or low, level of control signals are input into R-port 21, G-port 22, or B-port 23 via I/O 55. Also, these control signals are applied to a gate of FET 27, 28, or 29 via buffer amplifier 24, 25, or 26 and turn ON, or OFF, analog switches 40, 41, or 42, respectively.

Positive voltage regulator 31, having capacitors 32 and 33 for smoothing, generates a positive voltage with a specified potential. This voltage is divided into specified voltages by resistors 34 and 35 and is supplied to the non-inverted input terminal of differential amplifier 44 via switch 40. The voltage from positive voltage regulator 31 is divided by resistors 36 and 37 and is supplied to the non-inverted input terminal of differential amplifier 49 via switch 41. Also, the voltage from positive voltage regulator 31 is divided by resistors 38 and 39 and is supplied to the non-inverted input terminal of differential amplifier 49 via analog switch 42.

When light for R is generated, a high level of voltage is applied to R-port 21 from I/O 55. After the high level voltage is reversed by buffer amplifier 24, it is applied to a gate of FET 27 to turn ON FET 27. Additionally, when R-port 21 generates the noted high level of voltage, analog switch 40 turns ON. Subsequently, the voltage generated by positive voltage regulator 31 is supplied to the non-inverted input terminal of differential amplifier 44 via analog switch 40 after being divided into specified values by resistors 34 and 35. As a result, differential amplifier 44 generates a current, which is supplied to the base of NPN transistor 46, thereby turning NPN transistor 46 ON. Consequently, the electrical current flows along the path from FET 27 through LED 17, NPN transistor 46, and resistor 47, and generates R light by LED 17.

At this time, if a voltage at a specified voltage source increases for some reason, voltage at the inverted input terminal of differential amplifier 44 increases while the output current thereof decreases. Subsequently, an impedance between the collector and the emitter in NPN transistor 46 increases, thereby reducing the emitter current. As the emitter current of NPN transistor 46 decreases, the voltage at resistor 47 decreases to a lesser degree, thereby decreasing the potential at the connecting point between one end of resistor 47 and the emitter for NPN transistor 46.

On the other hand, when the voltage at a specified voltage source decreases, reducing the input voltage at the inverted input terminal of differential amplifier 44, the output current of differential amplifier 44 increases. This increases the base current of NPN transistor 46 as well as the emitter current of NPN transistor 46. Therefore, the terminal voltage at resistor 47 increases and the input voltage at the inverted input terminal of differential amplifier 44 also increases.

As described above, the current between the collector and the emitter of NPN transistor 46, in other words, the current through LED 17, becomes a constant current. As a result, even if a specified voltage source fluctuates due to noise, the amount of light generated by LED 17 becomes almost constant without being affected.

When generating light for R, low level signals are applied to G-port 22 and B-port 23. As a result, FETs 28 and 29, as well as analog switches 41 and 42, are turned OFF. When analog switches 41 and 42 are turned OFF, a voltage of 0 (zero) V is applied to the non-inverted input terminal of differential amplifier 49 via resistor 48. As a result, the output voltage of differential amplifier 49, as well as the base voltage that is applied via resistor 50, decreases, thereby turning NPN transistor 51 OFF. This causes NPN transistor 52, that is connected to NPN transistor 51 by a Darlington connection, to turn OFF. Consequently, LEDs 18 and 19 are turned OFF, thereby generating light only for R.

When generating light for G, high level signals are applied to G-port 22. Subsequently, low level signals are applied to the gate of FET 28 via buffer amplifier 25, thereby turning FET 28 ON. Additionally, as analog switch 41 comes on, the output voltage from positive voltage regulator 31 is supplied to the non-inverted input terminal of differential amplifier 49 via switch 41 after being divided into specified values by resistors 36 and 37. Subsequently, the output voltage of differential amplifier 49 increases, thereby turning ON NPN transistor 51 wherein the output voltage thereof is applied to its base via resistor 50, as well as NPN transistor 52. Consequently, the electrical current flows along the path from FET 28 through LED 18, NPN transistor 52, and resistor 53, and LED 18 generates light for G.

If a voltage supplied by a specified voltage source increases due to certain causes, the emitter currents of NPN transistors 51 and 52 increase. When the emitter current of NPN transistor 52 increases, the terminal voltage of resistor 53 increases, thereby elevating the voltage of the inverted input terminal of differential amplifier 49. Subsequently, the output current of differential amplifier 49 decreases and the base current of NPN transistor 51, as well as the emitter current thereof, decreases. Consequently, the base current of NPN transistor 52 decreases, thereby decreasing the emitter current of NPN transistor 52.

On the other hand, if the voltage at a specified voltage source decreases, the emitter current of NPN transistors 51 and 52 decrease. Subsequently, the terminal voltage of resistor 53 decreases, thereby decreasing the voltage of the inverted input terminal of differential amplifier 49. As a result, the output current of differential amplifier 49 increases and the base current of NPN transistor 51, as well as the emitter current, increase. Consequently, the base current of NPN transistor 52 increases, thereby increasing the emitter current thereof.

As described above, the electrical current between the collector and the emitter of NPN transistor 52 (i.e., the electrical current at resistor 53), and therefore the electrical current through LED 18 becomes a constant current.

When generating light for G, low level signals are applied to R-port 21 and B-port 23. As a result, FETs 27 and 29 are turned OFF and analog switches 40 and 42 are also turned OFF. When analog switch 40 is turned OFF, the low level of voltage is applied to the non-inverted input terminal of differential amplifier 44 via resistor 43, thereby decreasing the output current thereof. Subsequently, NPN transistor 46 turns OFF. Thus, LEDs 17 and 19, at this time, remain turned OFF.

Next, when generating light for B, high level signals are applied to B-port 23, thereby turning ON FET 29, and analog switch 42. When analog switch 42 turns ON, the output voltage generated by positive voltage regulator 31 is applied to the non-inverted input terminal of differential amplifier 49 via analog switch 42 after being divided by resistors 38 and 39. Subsequently, NPN transistor 52 turns ON. As a result, the electrical current flows along the path from FET 29, LED 19, NPN transistor 52, and resistor 53, thereby generating light for B.

In this case the electrical current that flows through NPN transistor 52 (i.e., LED 19) becomes a constant current in the same manner as described for generating light for G. In addition, as R-port 21 and G-port 22 are subjected to a low level of voltage, FETs 27 and 28 and analog switches 40 and 41 are turned OFF. Therefore, LEDs 17 and 18 do not generate light.

As described above, LED 17 for R is driven by one NPN transistor 46 whereas LED 18 for G and LED 19 for B are driven by NPN transistors 51 and 52 that are connected by a Darlington connection. This is done for the following reasons. Specifically, as LED 17 for R possesses better light emission efficiency than LEDs 18 and 19 for G and B, it is capable of generating the same amount of light as LED 18 or 19 with a smaller driving current. Subsequently, LED 17 for R, with better light emission efficiency, is driven by one NPN transistor 46 while LEDs 18 and 19 for G and B with inferior light emission efficiency are driven by NPN transistors 51 and 52 (with larger electrical current than LED 17 for R) in order to generate the same amount of light.

In the above noted configuration, an anode of LED 17 and cathodes of LEDs 18 and 19 are connected to L1, the cathode of LED 17 and anode of LED 18 are connected to line L2, and the anode of LED 19 is connected to line L3. Therefore, it is so designed that the three LEDs 17, 18, and 19 may be driven by three lines L1, L2, and L3. Normally, four lines are required in order to run three LEDs independently even if a cathode is shared. However, by connecting the LEDs in this manner, a line reduction may be achieved.

As described in the above embodiments, the LEDs that generate three primary colors (red, green and blue) are driven in sequence, and it possible to accurately provide fine control for exposure levels by controlling ON/OFF sequences thereof. Additionally, as it is no longer required to change filters, a scanning operation may be performed in a short period of time. Furthermore, a cooling mechanism for reducing heat radiation is not required because of low heat generation of LEDs. By placing a FIFO memory between the A/D converter and the memory, the LEDs may be turned ON or OFF without being affected by the A/D conversion operation. As a result, fine exposure control is possible. Through the use of the constant current circuits of the LED drive circuit, a constant amount of light is always generated regardless of the noise at the electrical power source, thereby providing means to more evenly read the images of the document.

Although a few preferred embodiments of the invention have been shown and described, it will be appreciated by those skilled in the art, that many changes may be made in these embodiments without departing from the principles and spirit of the present invention, the scope of which is defined in the claims and their equivalents.

What is claimed is:

1. A color image scanner for reading images from a document, the color image scanner comprising:

a plurality of light-emitting diodes radiating a corresponding plurality of light colors onto the document;

means for reading the plurality of light colors radiated on the document and forming image signals;

control means for generating timing control signals corresponding to said plurality of light-emitting diodes and said reading means; and means for alternatively driving said plurality of light-emitting diodes by supplying respective currents through said plurality of light-emitting diodes in response to said corresponding timing control signals and maintaining the currents constant in response to feed-back of the values of the currents flowing in said respective light-emitting diodes.

2. The color image scanner as claimed in claim 1, further comprising:

a FIFO memory, connected to said reading means, for receiving and temporarily storing the image signals; and a memory, connected to said FIFO memory, for storing the temporarily stored image signals;

wherein said FIFO memory receives and stores the image signals from said reading means while said memory is receiving and storing the image signals from said FIFO memory.

3. The color image scanner as claimed in claim 1, wherein said means for driving and maintaining comprises:

a selector circuit transferring a plurality of voltages to corresponding said plurality of light-emitting diodes in response to the timing control signals;

a first constant current circuit for maintaining a first constant current through a first one of said plurality of light-emitting diodes in response to a first one of said timing control signals; and a second constant current circuit for supplying second and third constant currents to second and third ones of said plurality of light-emitting diodes in response to second and third ones of the tinting control signals, respectively.

4. The color image scanner as claimed in claim 3, wherein said first one of said plurality of light-emitting diodes is a red light-emitting diode, and wherein said second and third ones of said plurality of light-emitting diodes are green and blue light-emitting diodes.

5. A color image scanner for reading images from a document, the color image scanner comprising:

a plurality of light-emitting diodes radiating a corresponding plurality of light colors onto the document;

means for reading the plurality of light colors radiated on the document and forming image signals;

a first timer setting operation times of said reading means and start times of said plurality of light-emitting diodes; and a second timer setting end times of said plurality of light-emitting diodes, thus generating the timing control signals;

means for alternatively driving said plurality of light-emitting diodes by supplying respective currents through said plurality of light-emitting diodes in response to said start times and said end times and for driving said reading means by supplying said operation times and maintaining the currents constant in response to feed-back from said respective light-emitting diodes.

6. A color image scanner for reading images from a document, the color image scanner comprising:

a processing unit generating drive control signals and operation control signals;

first, second and third light-emitting diodes (LEDs) radiating first, second and third light colors onto the document;

LED drive means for independently driving each of said first, second and third light emitting diodes in response to said drive control signals;

a photoelectric conversion element receiving the first, second and third light colors when said first, second and third light colors are radiated onto the document and, in response thereto, generating analog signals according to the operation control signals;

an analog-to-digital converter for converting the analog signals to digital signals;

a memory unit storing the digital signals; and said processing unit including a first timer for setting operation times of said photoelectric conversion element to receive the first, second and third color lights, to generate said operation control signals; and a second timer for setting the ON times of each of said first, second and third LEDs, to generate the drive control signals.

7. The color image scanner as claimed in claim 6, wherein said LED drive means comprises:

a selector circuit transferring first, second and third voltages to said first, second and third LEDs in response to first, second third ones of the drive control signals, respectively;

a first constant current circuit for maintaining a first constant current through said first LED in response to the first drive control signal;

a second constant current circuit for supplying second and third constant currents to said second and third LEDs in response to the second and third drive control signals, respectively; and switch means for selectively enabling transmission of a fourth voltage to said first constant current circuit and fifth and sixth voltages to said second constant current circuit in response to the first, second and third drive control signals, respectively.

8. The color image scanner as claimed in claim 7, wherein said first LED has a higher light emission efficiency than said second and third LEDs and said first constant current is less than said second and third constant currents.

9. The color image scanner as claimed in claim 8, wherein said first LED emits red light, said second LED emits green light and said third LED emits blue light.

10. A color image scanner for reading images from a document, the color image scanner comprising:

first, second and third light-emitting diodes (LEDs) radiating first, second and third light colors onto the document;

a photoelectric conversion element receiving the first, second and third light colors when the first, second and third light colors are radiated onto the document and, in response thereto, generating analog signals;

a first timer setting operation times of said reading means and respective start times of said first, second and third LEDs;

a second timer setting respective end times of said first, second and third LEDs; and LED drive means for independently driving each of said first, second and third LEDs by respective first, second and third constant currents in response to respective said corresponding start and end times and maintaining said first, second and third constant currents constant in response to feedback from said respective light-emitting diodes.

11. The color image scanner as claimed in claim 10, wherein said LED drive means comprises:

a first constant current circuit for supplying the first constant current to said first LED in response to a first one of the drive control signals;

a second constant current circuit for supplying the second and third constant currents to said second and third LEDs in response to second and third ones of the drive control signals, respectively; and a selector circuit for alternately driving said first, second and third LEDs in response to the first, second and third drive control signals, respectively.

12. The color image scanner as claimed in claim 11, further comprising:

a first line connecting said selector circuit to said first constant current circuit, an anode of said first LED, and cathodes of said second and third LEDs;

a second line connecting said selector circuit to said second constant current circuit, a cathode of said first LED, and an anode of second LED; and a third line connecting said selector circuit to an anode of said third LED.

13. The color image scanner as claimed in claim 12, wherein said first LED emits the light color red.

14. The color image scanner as claimed in claim 10, wherein said LED drive means comprises:

a first constant current circuit for supplying the first constant current to said first LED in response to a first one of the drive control signals;

a second constant current circuit for supplying the second and third constant currents to said second and third LEDs in response to second and third ones of the drive control signals, respectively; and a selector circuit for alternately driving said first, second and third LEDs in response to the first, second and third drive control signals, respectively.

15. The color image scanner as claimed in claim 10, wherein said LED drive means comprises:

a selector circuit transferring first, second and third voltages to said first, second and third LEDs in response to first, second third ones of the drive control signals, respectively;

a first constant current circuit for maintaining the first constant current through said first LED in response to said first drive control signal;

a second constant current circuit for supplying the second and third constant currents to said second and third LEDs in response to the second and third drive control signals, respectively; and switch means for selectively enabling transmission of a fourth voltage to said first constant current circuit and fifth and sixth voltages to said second constant current circuit in response to the first, second and third drive control signals, respectively.

16. The color image scanner as claimed in claim 15, further comprising:

a first line connecting said selector circuit to said first constant current circuit, an anode of said first LED, and cathodes of said second and third LEDs;

a second line connecting said selector circuit to said second constant current circuit, a cathode of said first LED, and an anode of said second LED; and a third line connecting said selector circuit to an anode of said third LED.

17. A color scanning method for reading an image line by line on a document, said color scanning method comprising the steps of:

performing a first scan by radiating three different colored first scan lights from three respective light emitting diodes LEDs, consecutively, on a line of the document and photoelectrically converting each of the three different colored lights passing through the document;

calculating exposure levels on the line for the three different colored first scan lights radiated on the line, respectively, based on performing said first scan;

determining respective operation times for photoelectrically converting each of three different colored second scan lights used in performing a second scan and respective ON times for each of said first, second and third LEDs, based upon said calculated exposure levels, the three different colored first scan lights being the same colors as the three different colored second scan lights, respectively; and performing said second scan by radiating the three different colored second scan lights consecutively from the three respective LEDs, respectively, on the line of the document based upon the respective ON times, and photoelectrically converting each of the three second scan lights passing through the document based upon the respective operation times.

18. The color scanning method as claimed in claim 17, further comprising:

setting the operation times with a first timer; and setting the ON times for each of the first, second and third LEDs with a second timer.

19. The color scanning method as claimed in claim 17, wherein the first LED is turned on prior to the second and third LEDs during the first and second scans, and has a higher light emission efficiency than the first and second LEDs.

* * * * *

UNITED STATES PATENT AND TRADEMARK OFFICE
CERTIFICATE OF CORRECTION

PATENT NO. : 5,625,470
DATED : April 29, 1997
INVENTOR(S) : UETA et al.

It is certified that error appears in the above-indentified patent and that said Letters Patent is hereby corrected as shown below:

Column 13, line 55, (claim 3) "tinting" should be --timing--.

Signed and Sealed this

Sixteenth Day of September, 1997

Attest:

BRUCE LEHMAN

Attesting Officer

Commissioner of Patents and Trademarks